United States Patent
Browning et al.

(10) Patent No.: US 6,633,897 B1
(45) Date of Patent: Oct. 14, 2003

(54) METHOD AND SYSTEM FOR SCHEDULING THREADS WITHIN A MULTIPROCESSOR DATA PROCESSING SYSTEM USING AN AFFINITY SCHEDULER

(75) Inventors: Luke Matthew Browning, Austin, TX (US); Jeffrey Scott Peek, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1425 days.

(21) Appl. No.: 08/497,481

(22) Filed: Jun. 30, 1995

(51) Int. Cl.⁷ .................................................. G06F 9/00
(52) U.S. Cl. ........................ 709/103; 709/100; 709/102
(58) Field of Search ................................. 395/672, 673

(56) References Cited

U.S. PATENT DOCUMENTS

| | | | |
|---|---|---|---|
| 5,136,590 A | | 8/1992 | Polstra et al. |
| 5,168,566 A | * | 12/1992 | Kuki et al. ................. 395/672 |
| 5,222,217 A | * | 6/1993 | Blount et al. .............. 395/325 |
| 5,261,053 A | * | 11/1993 | Valencia .................... 395/200 |
| 5,317,738 A | * | 5/1994 | Cochcroft, Jr. et al. ..... 395/650 |
| 5,515,538 A | * | 5/1996 | Kleiman .................... 395/673 |

OTHER PUBLICATIONS

Vaswani et al, The Implicatious of Cache Affinity on Processor scheduling for Multiprogrammed, Shared Memory Multiprocessors, ACM, 1991.*

* cited by examiner

Primary Examiner—Majid Banankhah
(74) Attorney, Agent, or Firm—Diana L. Roberts; Leslie A. Van Leeuwen; Bracewell & Patterson, L.L.P.

(57) ABSTRACT

A method and system for establishing a priority order of threads executed within a multiprocessor data processing system are disclosed. The priority order of threads is maintained on a global queue within the data processing system and the queue is ordered by selecting a most favored runnable thread from among either a current thread, a favored thread, or an affinity thread. Once the thread is chosen, be it the current thread, the most favored thread, or the affinity thread, the chosen thread is removed from a run queue and then is run on the data processing system on a selected processor. An affinity thread pointer is updated to the thread being run to select the next affinity thread or the thread having the greatest affinity.

3 Claims, 4 Drawing Sheets

METHOD AND SYSTEM FOR SCHEDULING THREADS WITHIN A MULTIPROCESSOR DATA PROCESSING SYSTEM USING AN AFFINITY SCHEDULER

BACKGROUND OF THE INVENTION

1. Technical Field

The present invention relates in general to a method and system for improved data processing and in particular to an improved method and system for data processing within a multiprocessor data processing system. More particularly still, the present invention relates to an improved method and system for optimizing thread processing in a multiprocessor data processing system.

2. Description of the Related Art

The use of threads in modern operating systems is well known. Threads allow multiple execution paths within a single address space to run concurrently on a processor. This increases throughput in a multiprocessor system and provides modularity in a uniprocessor system.

A typical multiprocessor data processing system has both a global and a local execution queue. Threads are assigned from the global execution queue to a particular local execution queue associated with a processor on the basis of affinity, that is, threads having a high degree of shared resource utilization are assigned to the same local execution queue. An execution queue is a listing of such threads to be executed in an orderly fashion on a data processing system.

The multiprocessor data processing system must be able to efficiently schedule a thread to execute. Most of these data processing systems have local caches, which is a fast memory dedicated to a particular processor. It is desirable to make use of an already loaded local cache since reloading the cache is a comparatively time consuming operation that causes the processor to be idle while the cache is being reloaded.

The operating system used to control the data processing system typically attempts to make intelligent scheduling decisions to increase throughput and responsiveness. The local execution queue identifies the threads that have run, or will be run, on each processor. Threads that are on the local execution queue will not move to another processor's local execution queue unless acted upon by the operating system as to achieve an equitable load balancing to avoid idle processors, or if it is determined that the threads affinity has been degraded or lost and the cost to run the thread on any other processors in the system is the same.

An additional option is to identify the threads cache utilization, or cache footprint, in order to make the best decision in scheduling. Unfortunately, not all systems are able to have means for identifying a thread's cache utilization or cache footprint.

Accordingly, what is needed is a method and apparatus for scheduling execution or run affinity using a global run queue, which is the only run queue in the system. Additionally, what is needed is a method that allows each processor to know or keep track of the thread that previously ran and is able to attempt to rerun the same thread if possible, to utilize the existing cache footprint.

SUMMARY OF THE INVENTION

It is one object of the present invention to provide a method and system for improved data processing.

It is another object of the present invention to provide an improved method and system for data processing within a multiprocessor data processing system.

It is yet another object of the present invention to provide an improved method and system for optimizing thread processing in a multiprocessor data processing system.

According to the present invention, a method and system for establishing a priority order of threads executed within a multiprocessor data processing system are disclosed. The priority order of threads is maintained on a global queue within the data processing system and the queue order is determined by selecting a most favored runnable thread from among either a current thread, a most favored thread, or an affinity thread. The current thread and affinity thread are only selected if they have the same priority as the most favored thread. Once the thread is chosen, be it the current thread, the most favored thread, or the affinity thread, the chosen thread is taken off the run queue and then is run on the data processing system on a selected processor. An affinity thread pointer is updated to the thread being run to select the next affinity thread or the thread having the greatest affinity. The affinity thread is determined, as being the previous and whether that thread is still runnable.

Alternatively, the system may determine whether a current thread may still be run on one of the plurality of processors and, if so, place that current thread on the run queue. Next, the system selects the thread at the top of the run queue, which has the highest priority. If the affinity thread has equal priority to the highest priority thread, then it is run first within the selected processor within the data processing system.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
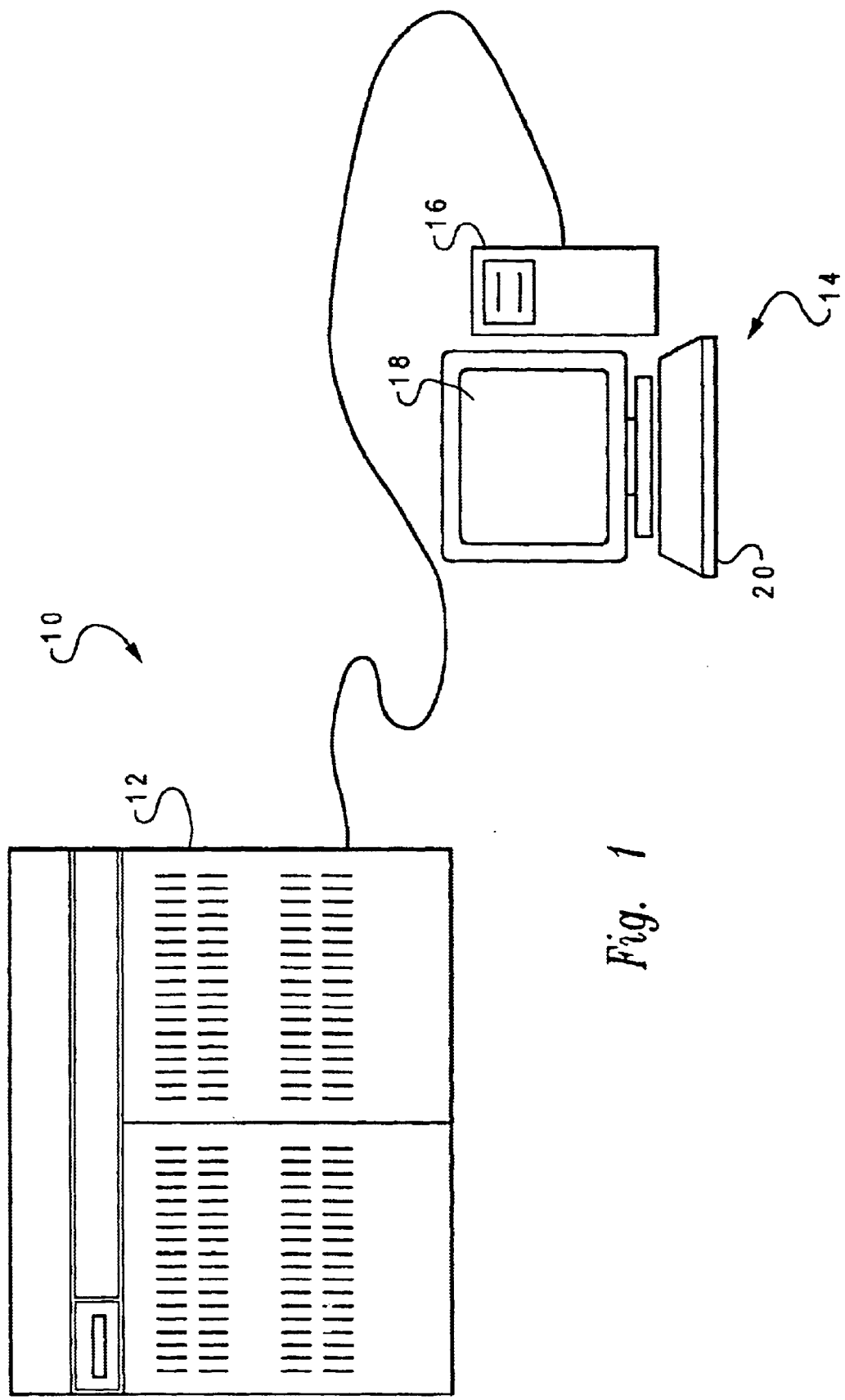
FIG. 1 illustrates a preferred embodiment of a multiprocessor data processing system which utilizes the method and system of the present invention.

With reference now to the figures and in particular with reference to FIG. 1, there is illustrated a preferred embodiment of a multiprocessor data processing system which employs the method and system of the present invention. As illustrated, data processing system 10 comprises system unit 12 and one or more local nodes 14, which include personal computer 16, display 18, and keyboard 20. As is well know to those skilled in the art, a user inputs data to personal computer 16 utilizing keyboard 20, or other suitable input device. The user may then process the data locally utilizing personal computer 16, or transmit the data from personal computer 16 to system unit 12 utilizing well-known networking techniques. According to the present invention, system unit 12 comprises a multiprocessor data processing system having multiple processors and a single global execution queue. Because system unit 12 can simultaneously execute a thread on each of its processors, system unit 12 provides greatly enhanced performance over personal computer 16. System unit 12 and personal computer 16 output data to a user via display device 18.

Figure 2:
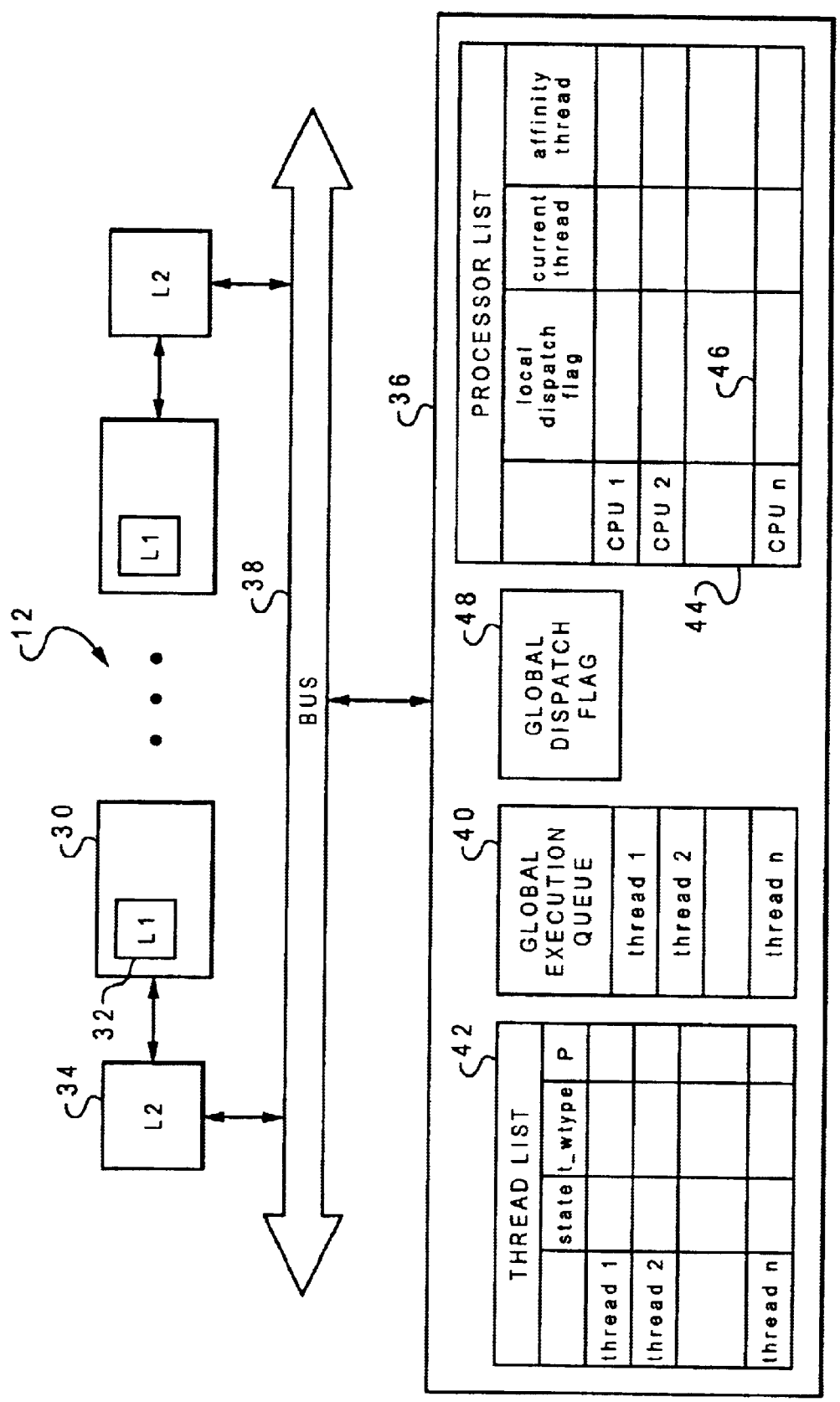
FIG. 2 depicts a block diagram of the system unit of the multiprocessor data processing system illustrated in FIG. 1.

Referring now to FIG. 2, there is depicted a block diagram of a preferred embodiment of system unit 12. System unit 12 includes a number of processors 30, which each include an on-board level 1 (L1) cache 32. Each L1 cache 32 comprises a small amount of high speed memory which stores a local copy of data utilized by its associated processor 30. When data requested by a processor 30 is not resident within its associated L1 cache 32, processor 30 will attempt to load the requested data from an associated L2 cache 34, which comprises an optional second level within the memory hierarchy. Each L2 cache 34 may be shared by multiple processors 30. When data requested by processor 30 is not resident within its associated L1 cache 32 or L2 cache 34, the data request is forwarded to global memory 36, which is accessible to each processor 30 via bus 38. As will be understood by those skilled in the art, global memory 36 may include one or more individual modules of physical memory.

In addition to storing data, global memory 36 includes global execution queue 40 which lists threads which are executable, but are not currently being executed by one of processors 30. As will be described in greater detail below, when a processor 30 requires a new thread to execute, processor 30 runs a dispatcher routine which selects a thread from global execution 40 for execution by processor 30. Global memory 36 also includes thread list 42, which specifies the state of each thread within system unit 12, including both threads within global execution queue 40 and those executing within processors 30. Possible states of threads will be described in greater detail with reference to FIG. 3. In addition to specifying the state of each thread, thread list 42 also indicates a priority (P) and a wait type (T_WTYPE) that further describes the thread state. In addition to tracking the execution of each thread, system unit 12 maintains processor list 44, which identifies the current thread running and the affinity thread on each processor 30. Processor list 44 also includes a local dispatch flag 46 for each processor 30 that may only be set by its associated processor 30. As will be described below, a processor 30 sets its associated local dispatch flag 46 to force a call to the dispatcher routine which selects a thread to run on processor 30.

Finally, global memory 36 includes global dispatch flag 48. Global dispatch flag 48 is set to indicate that the priority of a thread added to global execution queue 40 is greater than the priority of a thread currently being executed by one of processors 30. Setting global dispatch flag 48 forces a call to the dispatcher from the exception and interrupt environments to ensure that the highest priority threads within thread list 42 are executed while lower priority threads await execution on global execution queue 40. Although information within global memory 36 utilized to manage the operation of system unit 12 has been described with reference to global execution queue 40, thread list 42, processor list 44, and global dispatch flag 48, those skilled in the art will appreciate that a variety of different data structures may be implemented within global memory 36 to store this information.

Figure 3:
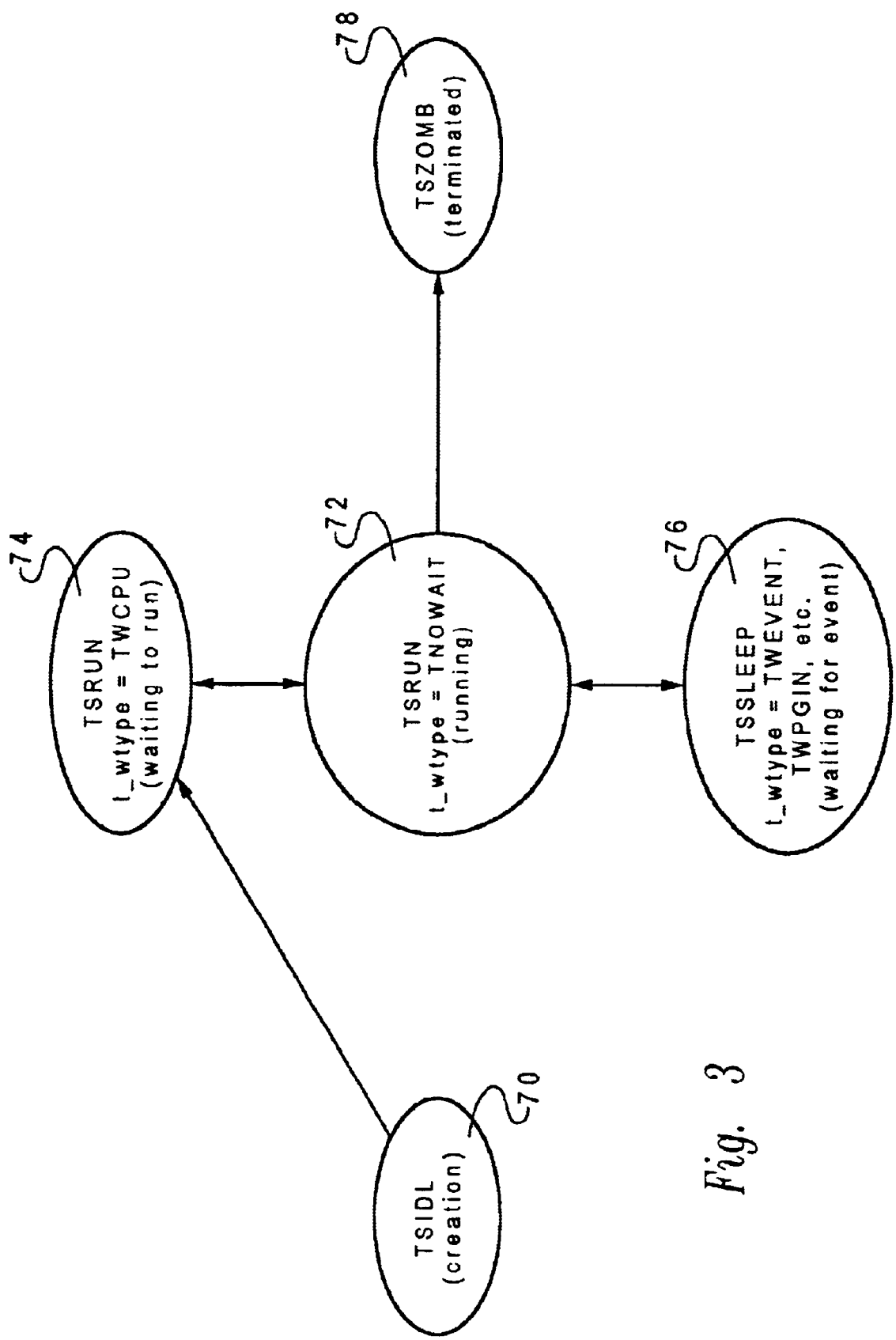
FIG. 3 is a state diagram illustrating possible execution states of threads within a multiprocessor data processing system utilizing the present invention.

With reference now to FIG. 3, there is illustrated a diagram of possible thread states. As illustrated, a thread originates at state 70 (TSIDL) and proceeds to state 74 (TSRUN), which represents the state of threads on global execution queue 40 waiting to run. The wait type of threads on global execution queue 40 is set to TWCPU, indicating that the threads are runnable, but lack a resource on which to run. When a thread is selected to run on a particular processor 30, the thread state makes a transition to state 72, which is the state of threads currently executing within one of processors 30. As indicted, when a thread is running, its wait type is TNOWAIT, specifying that execution of the thread is not waiting on an event or resource. While the thread is executing within a processor 30, the thread state can proceed from state 72 to either of states 74 (TSRUN) or 76 (TSSLEEP). A thread changing state from state 72 to state 74 indicates that execution of the thread by a processor 30 has been suspended and that the thread has been returned to global execution queue 40. As illustrated, when the thread is again dispatched to a processor 30 for execution, the thread state returns from state 74 to state 72. For example, when time slicing is implemented within system unit 12, a thread in state 72 that is executing within a processor 30 will make a state transition to state 74 when execution of the thread is preempted in favor of the next thread within global execution queue 40 which has the same priority as the current thread.

When a thread running in state 72 makes a state transition to state 76 (TSSLEEP), the thread is "put to sleep." In other words, execution of the thread is suspended until the occurrence of the event specified by the thread's associated wait type. For example, when a thread executed by a processor 30 within system unit 12 page faults, that is, when continued execution of the thread requires a page of virtual memory not resident within global memory 38, execution of the thread must be suspended until the required page is loaded from secondary storage. Thus, the thread is not waiting for a resource as at state 74, but is rather waiting on the occurrence of an event. Since threads that are sleeping are not available to be dispatched, threads in state 76 are not placed on global execution queue 40. Upon the occurrence of the event specified by a sleeping thread's wait type, the thread returns from state 76 to state 72. After execution of the thread is complete, the thread makes a final state transition from state 72 to state 78, where execution terminates.

Whenever an application runs, one of the resources it needs is physical memory. The physical memory is allocated to process usually on a demand-basis, that is, the application only gets the memory necessary to solve the immediate shortage. When an application has a shortage, a "page fault" occurs that is handled by the "virtual memory manager" and a page of physical memory is assigned to the application. This physical memory may or may not have an associated "backing store/paging" assigned as well. This backing store is usually a disk block used to save the contents if the physical page assigned is modified. So, the working set of the application is the collection of physical memory pages that have currently been accessed by the application. The latest pages accessed will have elements of the pages "cached" in the L1 cache and the L2 cache, if the L2 cache is available.

Processor affinity is a function of a thread's working set and a processor's cache. The greater the working set in the cache, the greater the affinity that the thread has with that cache and, by extension, with that processor. Unfortunately, it is difficult to determine what a thread will do next, so the most practical consideration is to guess based on what it has done in the most recent past. Thus, according to the present invention, an improved method and system are provided that allow the system dispatcher to achieve many of the benefits of determining what a thread will do next without adding significant path length to the dispatcher. In the preferred embodiment, the operating system, such as AIX, employs a priority based scheduling system. The run queue is subdivided into 128 first-in-first-out (FIFO) queues, where there is a unique queue for each priority level. Each queue may hold multiple threads.

When the dispatcher is entered, the most favored runnable thread, including the current running thread, is identified. This thread is then dispatched next unless one of the following is true. First, the most favored thread has the same priority as the current thread. In this case, the current thread is re-dispatched since no thread has better affinity. Second, the most favored thread has the same priority as the affinity thread, which is the case that the affinity thread is dispatched. Typically, the affinity thread is the previous thread that ran.

Figure 4:
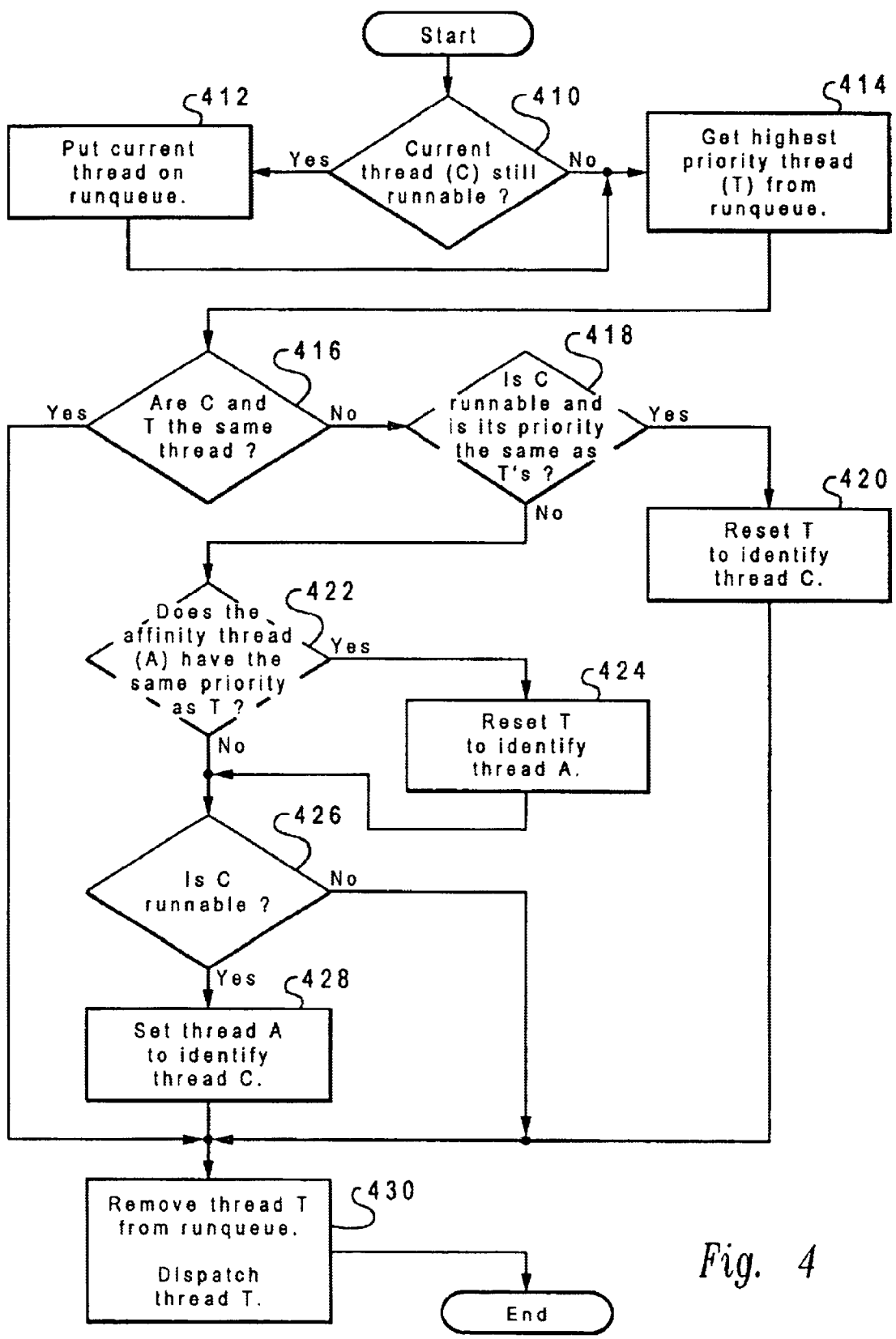
FIG. 4 is a flowchart depicting the logic of the dispatcher subroutine that is used to determine the thread that will next be chosen to run on the processor.

To achieve affinity without the use of a local execution queue, the system, based on the flow chart depicted in the diagram of FIG. 4, determines the thread with the highest affinity for the next run operation. The system first, in block 410, determines if the current thread (c) is still runnable and if so, proceeds to block 412 where the current thread (c) is put on the execution or run queue. Otherwise, if the current thread is not runnable or the current thread has not been placed on the run queue, the system proceeds to block 414. In block 414, the system gets the highest priority thread (T) from the run queue. Thread (T) is the thread that will be dispatched. Initially, it is set to the highest priority thread. However, if the current thread or the affinity thread is chosen, then the variable (T) is reset to that thread. Next, the system determines in block 416 if (C) is the same thread as (T) or if the current thread is the same thread as the highest priority thread from the run queue. If the current thread is not the same as the thread having the highest priority, the system proceeds to block 418 where it is determined whether (C) is runnable and has the same priority as the highest priority thread (T). If the current thread and the highest priority thread have the same priority the system proceeds to step 420 otherwise, the system proceeds to step 422.

In step 420, the system resets the thread with the highest priority to identify the current thread (C). Afterwards, the system then proceeds to step 430. If the current thread is not runnable and does not have the same priority as the thread with the highest priority then, in step 422, the system determines if the affinity thread (A) has the same priority as the thread with the highest priority (T). If yes, the system proceeds to step 424 where the system resets the thread with the highest priority to identify thread (A). Once the thread to be dispatched has been identified as the affinity thread or if the affinity thread does not have the same priority as the thread with the highest priority, the system proceeds to step 426 where the system determines if the current thread is runnable and if not proceeds to step 430; otherwise, the system proceeds to step 428 where the system sets the affinity thread (A) to identify the current thread (C). Afterwards, the system proceeds to step 430.

The system, in step 430 removes the thread to be dispatched from the run queue and dispatches the highest priority to run on the system.

While the invention has been particularly shown and described with reference to a preferred embodiment, it will be understood by those skilled in the art that various changes in form and detail may be made therein without departing from the spirit and scope of the invention.

What is claimed is:

1. A method with a multiprocessor data processing system including a plurality of processors, and a single execution queue of multiple threads from which threads are dispatched for execution by any said plurality of processors in a priority order, for establishing said priority order, said method comprising:

(a) determining whether a current executing thread may still be run on a selected one of said plurality of processors;

(b) in response to said current executing thread being runnable, placing said current executing thread on said single execution queue;

(c) in response to an availability of said selected one of said plurality of processors selecting a thread having the highest priority on said single execution queue;

(d) determining whether said current executing thread has the same priority as said thread having highest priority selected from said single execution queue;

(e) upon determining said current executing thread and said highest priority thread are equal, running said current executing thread;

(f) otherwise, if said highest priority thread is greater in priority than said current executing thread, determining whether a thread having affinity has the same priority as said highest priority thread, if said highest priority thread; and (g) running said affinity thread if equal to said thread having highest priority.

2. A multiprocessor data processing system including a plurality of processors, and a single execution queue of multiple threads from which threads are dispatched for execution by any said plurality of processors in a priority order, for establishing said priority order, said system comprising:

(a) means for determining whether a current executing thread may still be run on a selected one of said plurality of processors;

(b) means for placing said current executing thread on said single execution queue in response to said current executing thread being runnable;

(c) means for selecting a thread having the highest priority on said single execution queue in response to an availability of said selected one of said plurality of processors;

(d) means for determining whether said current executing thread has the same priority as said thread having highest priority selected from said single execution queue;

(e) means for running said current executing thread upon determining said current executing thread and said highest priority thread are equal in priority;

(f) means for otherwise determining whether a thread having affinity has the same priority as said highest priority thread, if said highest priority thread is greater in priority than said current executing thread; and (g) means for running said affinity thread if equal in priority to said thread having highest priority.

3. A computer program product for use within a multiprocessor data processing system including a plurality of processors, and a single execution queue of multiple threads from which threads are dispatched for execution by any of said plurality of processors in a priority order, for establishing said priority order, said computer program product comprising:

(a) computer readable program code for determining whether a current executing thread may still be run on a selected one of said plurality of processors;

(b) computer readable program code for placing said current executing thread on said single execution queue in response to said current executing thread being runnable;

(c) computer readable program code for selecting a thread having the highest priority on said single execution queue in response to an availability of said selected one of said plurality of processors;

(d) computer readable program code for determining whether said current executing thread has the same priority as said thread having highest priority selected from said single execution queue;

(e) computer readable program code for running said current executing thread upon determining said current executing thread and said highest priority thread are equal in priority;

(f) computer readable program code for determining whether a thread having affinity has the same priority as said highest priority thread, if said highest priority thread is greater in priority than said current executing thread; and (g) computer readable program code for running said affinity thread if equal in priority to said thread having highest priority.

* * * * *